United States Patent
Khafizov et al.

(10) Patent No.: US 9,335,894 B1
(45) Date of Patent: May 10, 2016

(54) PROVIDING DATA INPUT TOUCH SCREEN INTERFACE TO MULTIPLE USERS BASED ON PREVIOUS COMMAND SELECTIONS

(75) Inventors: Farid Khafizov, Plano, TX (US); Margarita Khafizova, Plano, TX (US)

(73) Assignee: Open Invention Network, LLC, Durham, NC (US)

( * ) Notice: Subject to any disclaimer, the term of this patent is extended or adjusted under 35 U.S.C. 154(b) by 207 days.

(21) Appl. No.: 12/822,286

(22) Filed: Jun. 24, 2010

Related U.S. Application Data

(60) Provisional application No. 61/317,793, filed on Mar. 26, 2010.

(51) Int. Cl.
  *G06F 3/0482* (2013.01)
  *G06F 9/44* (2006.01)

(52) U.S. Cl.
  CPC ............ *G06F 3/0482* (2013.01); *G06F 9/4446* (2013.01)

(58) Field of Classification Search
  CPC ... G06F 3/0482; G06F 3/0481; G06F 9/4446; H04N 5/44543
  USPC .................................. 715/810, 811, 812, 813
  See application file for complete search history.

(56) References Cited

U.S. PATENT DOCUMENTS

| | | | |
|---|---|---|---|
| 6,046,741 A * | 4/2000 | Hochmuth .................... | 715/704 |
| 7,146,415 B1 * | 12/2006 | Doi .............................. | 709/224 |
| 7,353,232 B1 | 4/2008 | Kalucha et al. | |
| 2002/0062367 A1 | 5/2002 | Debber et al. | |
| 2002/0156668 A1 | 10/2002 | Morrow et al. | |
| 2003/0106039 A1 | 6/2003 | Rosnow et al. | |
| 2006/0184880 A1 * | 8/2006 | Bala ............................. | 715/705 |
| 2006/0259524 A1 | 11/2006 | Horton | |
| 2007/0219817 A1 | 9/2007 | Wu | |
| 2007/0261002 A1 * | 11/2007 | Hu et al. ...................... | 715/810 |
| 2008/0209417 A1 | 8/2008 | Jakobson | |
| 2009/0083634 A1 | 3/2009 | Madonna et al. | |
| 2009/0084612 A1 | 4/2009 | Mattice et al. | |
| 2009/0085877 A1 | 4/2009 | Chang et al. | |
| 2009/0143141 A1 | 6/2009 | Wells et al. | |
| 2009/0195518 A1 | 8/2009 | Mattice et al. | |
| 2009/0288038 A1 * | 11/2009 | Hirasaka ...................... | 715/811 |
| 2009/0327272 A1 * | 12/2009 | Koivunen ....................... | 707/5 |
| 2011/0016421 A1 * | 1/2011 | Krupka et al. ................ | 715/780 |
| 2011/0072033 A1 * | 3/2011 | White et al. .................. | 707/768 |

\* cited by examiner

*Primary Examiner* — Li Sun
(74) *Attorney, Agent, or Firm* — Haynes and Boone, LLP

(57) ABSTRACT

A method and apparatus of providing a touch sensitive interface to multiple users is disclosed. Example may include a method and apparatus to create a user menu option that a user may select to operate a particular application. The method may include determining an event has occurred based on a user selection operation and storing the occurrence of the event in memory, and determining the user's last command executed and storing the last command in the memory. Further operations may include identifying a sequence of events stored in the memory that match the user's last command executed and providing the menu option to the user based on the identified sequence of events stored in the memory, and prompting the use to select the menu option.

14 Claims, 9 Drawing Sheets

PROVIDING DATA INPUT TOUCH SCREEN INTERFACE TO MULTIPLE USERS BASED ON PREVIOUS COMMAND SELECTIONS

CROSS-REFERENCE TO RELATED APPLICATIONS

This application claims the benefit of prior filed U.S. Provisional Application Ser. No. 61/317,793, filed on Mar. 26, 2010, incorporated herein by reference.

This application relates to U.S. Provisional Application Ser. No. 61/317,741, filed on Mar. 26, 2010 and U.S. application Ser. No. 12/753,163 filed on Apr. 2, 2010 and U.S. Ser. No. 12/753,167 filed on Apr. 2, 2010 and U.S. Ser. No. 12/753,171 filed on Apr. 2, 2010 and U.S. Ser. No. 12/753,180 filed on Apr. 2, 2010 and U.S. Provisional Application Ser. No. 61/317,744 filed on Mar. 26, 2010 and U.S. Ser. No. 12/770,944 filed on Apr. 30, 2010 and U.S. application Ser. No. 12/770,965 filed on Apr. 30, 2010 and U.S. application Ser. No. 12/770,974 filed on Apr. 30, 2010 and U.S. Provisional Application Ser. No. 61/317,800 filed on Mar. 26, 2010 and U.S. Provisional Application Ser. No. 61/317,812 filed on Mar. 26, 2010 and U.S. Provisional Ser. No. 61/317,827 filed on Mar. 26, 2010, each of which is incorporated herein by reference.

TECHNICAL FIELD OF THE INVENTION

This invention relates to a method and apparatus of receiving data from touch sensitive interfaces of multiple users. In particular, the present invention includes a method and apparatus to detect user data input of multiple users collaborating on a single project.

BACKGROUND OF THE INVENTION

Touch sensitive screens are rapidly gaining popularity among users of interactive computing devices. Corporations, such as, Apple®, RIM®, Google® and Microsoft® have developed a large number of devices and/or applications that rely heavily on touch sensitive user interfaces. One particular area of increasing interest within the realm of touch sensitive user interfaces are multi-user (MU) touch detection and touch sensitive user interfaces.

In one example, a touch-screen may be a user display device that is configured to detect the presence and location of a user initiated touch gesture within the display area of the device. The ability to manipulate information by touching a screen provides an easy and intuitive way of operating a computing device. With recent reductions in the price of such touch-screen devices, large touch-sensitive screens are expected to become increasingly popular in business, education, and for retail customers.

A new trend in touch sensitive display technology is to have large tabletop displays, which are viewable by multiple viewers. Examples of these large displays may include a "collaboration Wall®" from Perceptive Pixel®, and other devices associated with Microsoft's "surface Project®". The collaboration wall is a large (81"×48") monitor developed by Perceptive Pixel, which was initially developed for military applications. The collaboration wall has received most of its publicity because of its use by the CNN® news network during its coverage of the 2008 U.S. Presidential election.

Such large displays provide new methods of data manipulation. For example, one or more users can move objects or other data illustrated on the display screen and/or manipulate information on the display screen in an interactive and intuitive way that is viewable to others.

Researchers of such touch-screen devices continue to innovate new ways to improve the touch-screen operation experience for tabletop and related wall-mounted displays. However, there are numerous design challenges and dilemmas that must be addressed in the creation of such displays. These problems include but are not limited to, how to detect intended touch from unintended (accidental) touch, how to identify multiple simultaneous touches by one or more users, how to improve the responsiveness of the computing devices to the various touch input signals received, etc.

Another example operation of the multi-touch display is with the arts, which have portrayed potential uses of such multi-touch technology as being the future of multi-user communication tools. For example, the 2002 science-fiction film "Minority Report©" provided different multi-touch features such as enlarging and moving objects around the display area. Additionally, the television series "CSI: Miami©" introduced both surface and wall displays, similar to Microsoft's surface project, in its sixth television season. Another form of a multi-touch computer display was included in the motion picture "The Island©", where the "professor" has a multi-touch desktop device that he uses to organize files, which was based on an early version of Microsoft's surface technology. Such technology can also be seen in the film "Quantum of Solace©."

Wide availability of large touch sensitive screens makes it possible for two or more users to collaborate and work together using a single touch sensitive screen. With the increasing adoption of touch screens, and, more particularly, multi-user touch screens, an increase in the performance and usability of detecting and interpreting inputs from multiple users is necessary to keep up with the increased demand of such devices.

SUMMARY OF THE INVENTION

Example embodiments of the present invention include a method, apparatus and computer readable storage medium configured to provide interaction between two or more users of an application via touch screen interface devices.

Example embodiments of the present invention may include a method of creating a user menu option that a user may select to operate a particular application. The method may include determining an event has occurred based on a user selection operation and storing the occurrence of the event in memory, and determining the user's last command executed and storing the last command in the memory. Other operations of the method may include identifying a sequence of events stored in the memory that match the user's last command executed, and providing the menu option to the user based on the identified sequence of events stored in the memory, and prompting the use to select the menu option.

Another example embodiment of the present invention may include an apparatus configured to create a user menu option that a user may select to operate a particular application. The apparatus may include a processor configured to determine an event has occurred based on a user selection operation. The apparatus may also include a memory configured to store the occurrence of the event. The processor is further configured to determine the user's last command executed and store the last command in memory, identify a sequence of events stored in the memory that match the user's last command executed, and provide the menu option to the user based on the identified sequence of events stored in the memory, and prompt the use to select the menu option.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings described briefly below.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and computer program product embodied on a computer readable storage medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

While the invention is being described in the foregoing context, it is not meant to be limiting as those skilled in the art will appreciate that several of the acts and operations described hereinafter may also be implemented in hardware and/or software.

Example embodiments of the present invention describe methods and related apparatuses to provide effective interaction of two or more users via a touch-screen interface on the same or several computing devices. Such example embodiments may include touch sensitive interfaces configured to be used by multiple users and corresponding computer applications. Such configurations support multi-user touch detection on the same touch sensitive screen, or, alternatively via a plurality of screens connected to a single touch-sensitive signal controller. For example, multiple touch sensitive screens can operate together to create one virtual large touch sensitive screen. Furthermore, the example embodiments of the present invention are not limited only to tabletop touch sensitive screens.

Figure 1A:
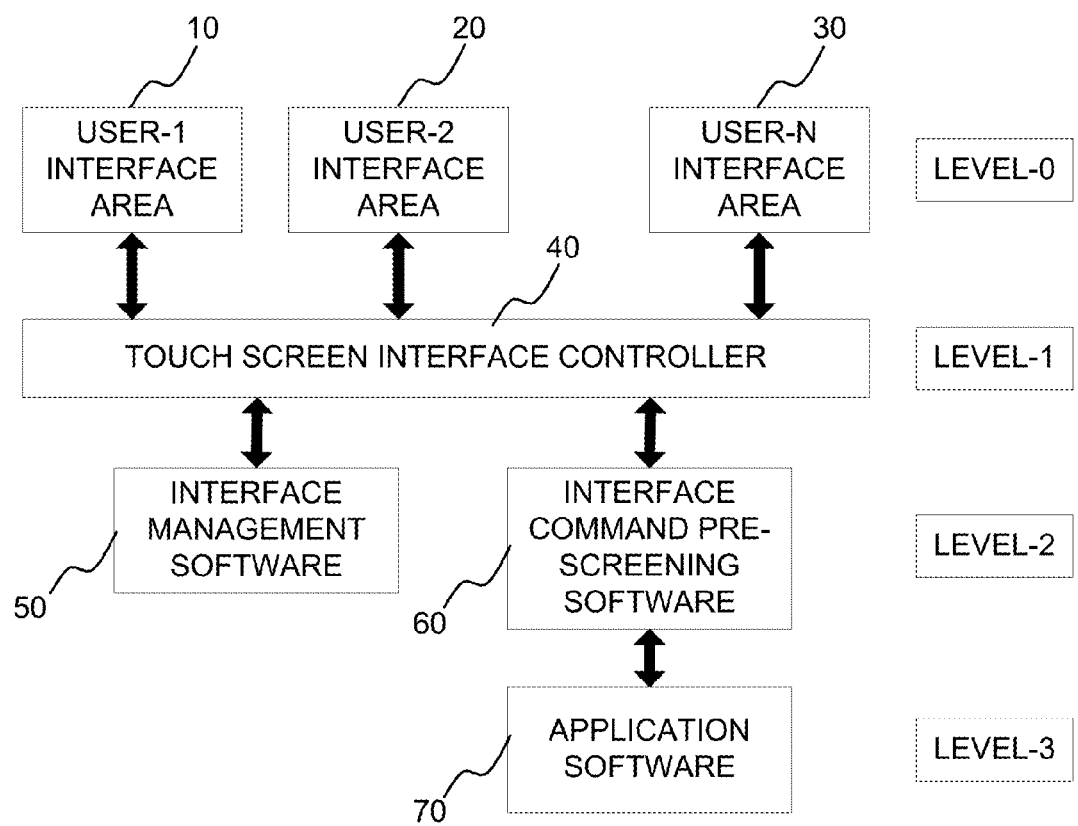
FIG. 1A is a block diagram, according to an example embodiment of the present invention.

FIG. 1A illustrates an example configuration of multiple users providing data input via a common touch screen interface controller, according to an example embodiment of the present invention. Referring to FIG. 1A, the touch screen configuration may be viewed as a multilayer configuration starting from a user interface 10-30 (level 0), and continuing with a touch screen interface controller 40 (level 1), auxiliary interface software, which includes interface management software 50 and interface command pre-screening software 60 (level 2), and also including application software 70 (level 3). Levels 0-2 provide a user interface, controller and software interface that offers multiple users with the ability to provide data input in a collaborative effort.

Some example embodiments of the present invention may provide a plurality of pre-existing and potentially new applications, such as, table games, art projects, landscape design, software architecture design, etc. These applications may be associated with touch-sensitive screen interfaces that are used to offer multiple users the ability to play and work together. In order to utilize touch sensitive interface(s) effectively, a configuration and method are needed to effectively coordinate data manipulation in a multi-user working environment, to allow quick addition of new applications, and to open multiple windows by the participants of the game/project.

According to one example embodiment of the present invention, user initiated touch commands may be detected as being displayed on the screen of the user interface device without linking the detected touch commands as actual commands. For example, consider a team of landscape architects as users working jointly on a single project. Each participant may work at his or her own user interface screen display device designing a particular image or set of images denoted as a "proposal." Once that particular user has finished his or her proposal by inputting ideas via the touch-sensitive interface, the user may select a "finished" or "submit" option to allow the other team members to view the proposal. At this point, the other members of the team will be able to view the proposal, and may continue doing so throughout the additional alterations of the design.

In another example, the submitted proposal may be canceled if there is no consensus among the participants of the project. For example, the participants may be prompted to vote out or accept portions of the submitted project being conducted by individual members. The moderator or leader may have ultimate authority to agree or disagree with the group. Or, alternatively, the majority of votes among the users may be decisive if the configuration is setup to include a democracy-type voting scheme.

The project leader, or the actual user proposing a particular design may decide to revert back to a previously saved design or abandon the current design by performing a "roll it back" command. In order to accomplish such a task, the configuration of the design layout application must be capable of displaying the current design efforts without actually committing to any proposed changes. Such a configuration may be implemented by a state machine diagram of the touch-command detection controller's operation along with its corresponding application.

Another example embodiment of the present invention may include sub-teams of a larger team working on a single project. The sub-teams may work in smaller groups on these smaller parts of the larger project.

In another example embodiment of the present invention, the history of touch commands made by each user is retained and stored in memory. When a particular sequence of commands becomes repetitive based on previous instances of commands, the user may take advantage of prompts offered by the application to reduce the amount of time used to recreate a particular design scenario.

Example embodiments of the present invention provide one or more users with a touch sensitive interface. Examples include, but are not limited to the following touch sensitive technologies: resistive, surface acoustic wave, capacitive, projected capacitance, infrared, strain gauge, optical imaging, dispersive signal technology, acoustic pulse recognition.

Currently, there is a large number of existing (e.g., table games) and potential new applications, such as, a "collaboration wall" (e.g., art design projects, digital content creation, etc.) for which touch-sensitive screen interfaces are a natural choice. Example embodiments of the present invention provide interaction of two or more users via a touch-screen interface on the same and/or several computing devices. Multiple touch sensitive screens can act as one virtual large touch sensitive screen. Therefore, the example embodiments of the present invention are not limited only to tabletop touch sensitive (TS) screens.

In order to provide touch sensitive interfaces to multi-user applications, there should be a configuration supporting multi-user touch detection on the same touch sensitive screen or a host of screens connected to a single touch-sensitive signal controller.

One example embodiment of the present invention may include multi-touch configurations that include a touch screen (e.g., screen, table, wall, etc.) and/or a touchpad, as well as a software application that recognizes multiple simultaneous touch points initiated by various users. Multiple touch points being performed in sequence, simultaneously, or, in a particular time frame may be recognized by the touch device through a variety of different technologies not limited to: heat sensing, finger pressure, high capture rate cameras, infrared light, optic capture, tuned electromagnetic induction, ultrasonic receivers, transducer microphones, laser rangefinders, and shadow capture.

A touch sensitive screen, also known simply as a "touch screen" may be a display configured to detect the presence and location of a touch within the display area. Even though touch screens can sense passive objects, such as a pen-shaped stylus, touch screens may also detect touch or contact to the display device by a finger or hand. Touch screens enable a user to interact with what is displayed directly on the display screen, and, at a point on the touch screen where an object is displayed. Such displays can be attached to computers and/or as terminals communicatively coupled to other computers and networks. Touch screens may also be used with digital appliances, such as, the personal digital assistant (PDA), satellite navigation devices, mobile phones (Iphone®), and video games.

There are a number of common types of touch screen technologies including resistive, surface acoustic wave, capacitive, projected capacitance, infrared, strain gauge, optical imaging, dispersive signal technology, and acoustic pulse recognition. Each of these technologies has its own advantages and disadvantages. For example, in resistive technology, the touch screen panel may be composed of several layers, the most important of which are two thin, metallic, electrically conductive layers separated by a narrow gap.

Resistive touch screens may be configured to support multi-touch. Surface acoustic wave (SAW) technology uses ultrasonic waves that pass over the touch screen panel. When the panel is touched, a portion of the wave is absorbed. This change in the ultrasonic waves registers the position of the touch event and sends this information to the controller for processing.

In the descriptions that follow, the example embodiments of the present invention are described with reference to acts and symbolic representations of operations that are performed by one or more computing devices, unless indicated otherwise. Therefore, it will be understood that such acts and operations, which are at times referred to as being computer-executed, include the manipulation by a processor of the computing device of electrical signals representing data in a structured form, which may also be stored in a tangible storage memory.

Figure 1B:
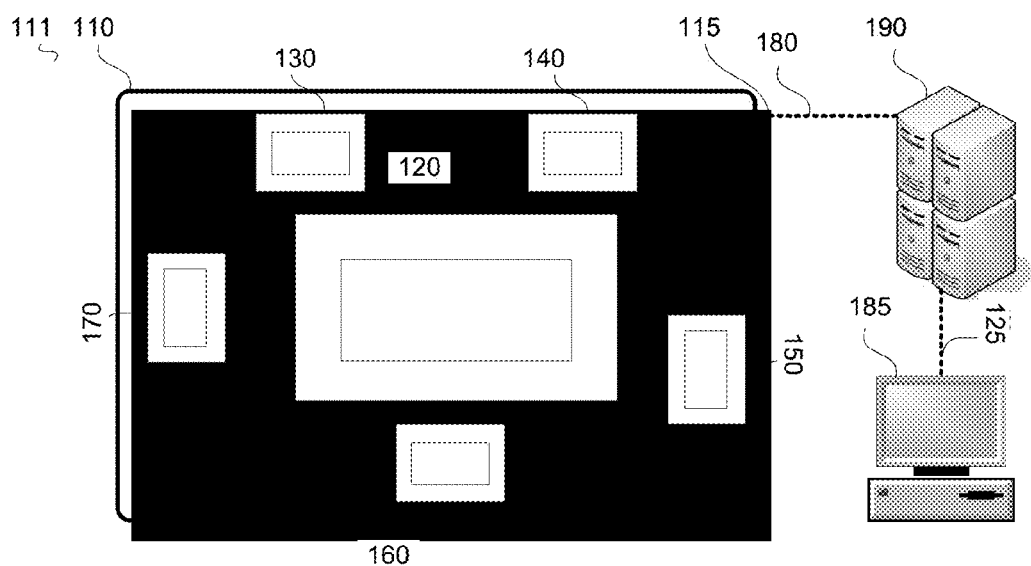
FIG. 1B is a touch screen configuration where multiple users have concurrent access to a touch sensitive interface, according to an example embodiment of the present invention.

FIG. 1B illustrates a large touch screen 110 that may be used concurrently by multiple users, according to an example embodiment of the present invention. Referring to FIG. 1B, an example of a computing environment 111 is illustrated with a large touch sensitive screen computing device 110 being used concurrently by multiple users working jointly on the same project at workstation computing devices 130, 140, 150, 160 and 170 (i.e., computers, handheld computing devices, etc.).

In one example, multiple users may be working on a joint landscape design. Assuming a group leader has assigned each of the user's a different portion of the project (i.e., sub-projects), then the users may design their portion on their own respective workstations 130, 140, 150, 160 and/or 170. The joint project screen 120 may be a larger screen that is configured to display the entire efforts of all users during project efforts and after project completion.

While designing the landscape one user may be assigned a zone section of the project, such as, the stone walkway at the top center portion of the customer's backyard. Other users may design a non-location specific portion of the landscaping, such as, a playground, which the users may then move around the layout illustrated on the main project screen 120 until a final decision is rendered. This example design may instead be a table game, such as, Monopoly®, where all the users are seated around a larger screen and interface via their own computing devices 130-170.

The project screen's entire area may be touch sensitive and can be used to pass commands through the touch detecting mechanism at the surface of the screen 110 to the controller portion of the screen 115. FIG. 1B illustrates a darker line 110 which represents the surface and touch area of the screen and the controller circuitry 115 is illustrated by the thinner line 115 and may be located below the surface of the touch screen 110. Details of the touch screen's circuitry and controller 115 have been omitted from further detail. The defined areas 120, 130, 140, 150, 160 and 170 may be virtual screens that are part of the larger screen 110.

Referring to FIG. 1B, shown schematically below the surface 110, the area of the screen 120 may be divided into several viewing areas which are based on the content of the user display screens 130, 140, 150, 160 and 170 (in this example we assume that we have five users). The content of the user display screens 130-170 may be recognized by the controller 115 as touch sensitive input interface areas for each participant of the project. Results of the joint work are reflected on the surface area of the joint screen 120, but may also be replicated by the application in each of the individual input areas 130, 140, 150, 160, and 170. Thus, each user may be able to see a copy of the joint project in their respective input areas.

Applications that can utilize such a touch sensitive multi-user interface include but are not limited to table games, landscape design, and software architecture design. Each participant can make changes to the project through the visual and intuitive touch sensitive interfaces 130-170 as if the whole team was working with real objects. Each users' input is passed from the controller 115 to the computing device 190 through the communication link 180, which includes but is not limited to a wire-line connection, such as, Ethernet, a wireless connection (Bluetooth, WiFi, etc.), or any other connection supporting information exchange between the controller 115 and computing devices 190, such as the Internet.

Computing device 190 interprets signals detected and passed by the controller 115 as commands to move objects illustrated on the screen 120. Once a signal detected by the controller 115 is received and interpreted by the computing device 190, the objects may be moved or re-arranged according to the users' instructions reflected in their corresponding input areas 120, 130, 140, 150, 160 and 170. The auxiliary computing device 185 may be used to configure the computing device remotely via a communication link 125.

Figure 1C:
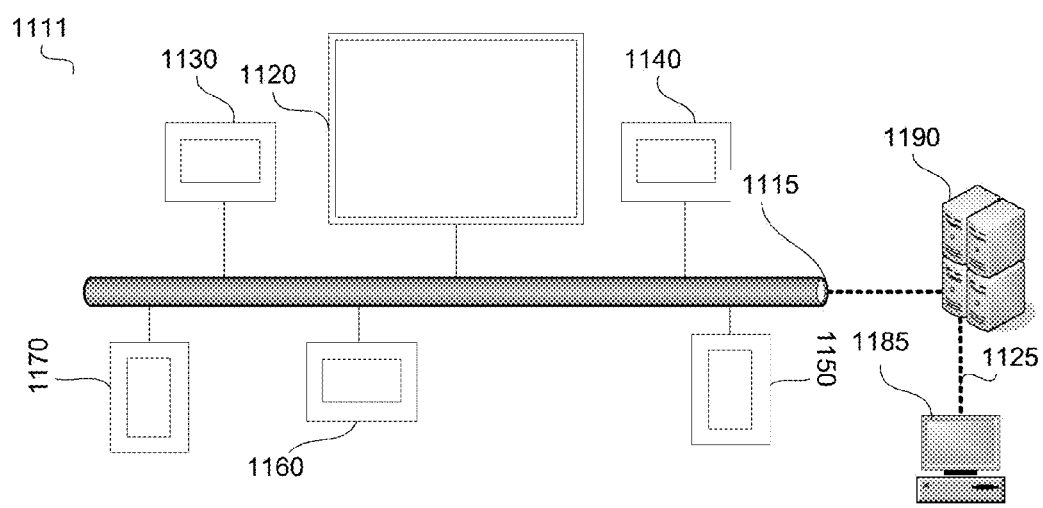
FIG. 1C illustrates a touch screen configuration where multiple users have concurrent access to a touch sensitive interface via physically separate devices and, therefore, form together a virtual large touch screen configuration similar to the one illustrated in FIG. 1B, according to an example embodiment of the present invention.

Another example multi-user configuration utilized in embodiments of the present invention is presented in FIG. 1C. Referring to FIG. 1C, a computing environment 1111 is illustrated as having a large virtual touch sensitive screen 1120 whose content is based on the input formed by multiple devices with smaller sized touch sensitive screens communicatively coupled to the same controller 1115. Touch sensitive interfaces of devices 1130, 1140, 1150, 1160, 1170, provide an input touch screen so that the results of the joint work may be reflected on screen 1120. All user devices 1130-1170 are connected through their respective controllers (not shown in the figure) to a common controller 1115 (illustrated as a bus of a common computing device). The same main computing device 1190 can be pre-configured through the auxiliary computing device 1185 via communication link 1125.

It should be noted that in FIG. 1C, each of the separate user devices 1130, 1140, 1150, 1160, 1170 can be a touch sensitive screen of another table-top, laptop, PDA, cell phone, etc., and the links connecting each device to the main computing device 1190 can be through the LAN network or other known communication interfaces which include, but are not limited to Bluetooth, infrared, Wi-Fi, etc. The users do not need to be located around the same room or table but may be located on other sides of the globe communicatively linked through the Internet. According to example embodiments of the present invention, the configurations illustrated in FIG. 1B and/or FIG. 1C permit collaboration of sub-teams of users working jointly on the same project. The users may work independently without interaction or together in active communication with one another to contribute to a larger project.

Figure 2A:
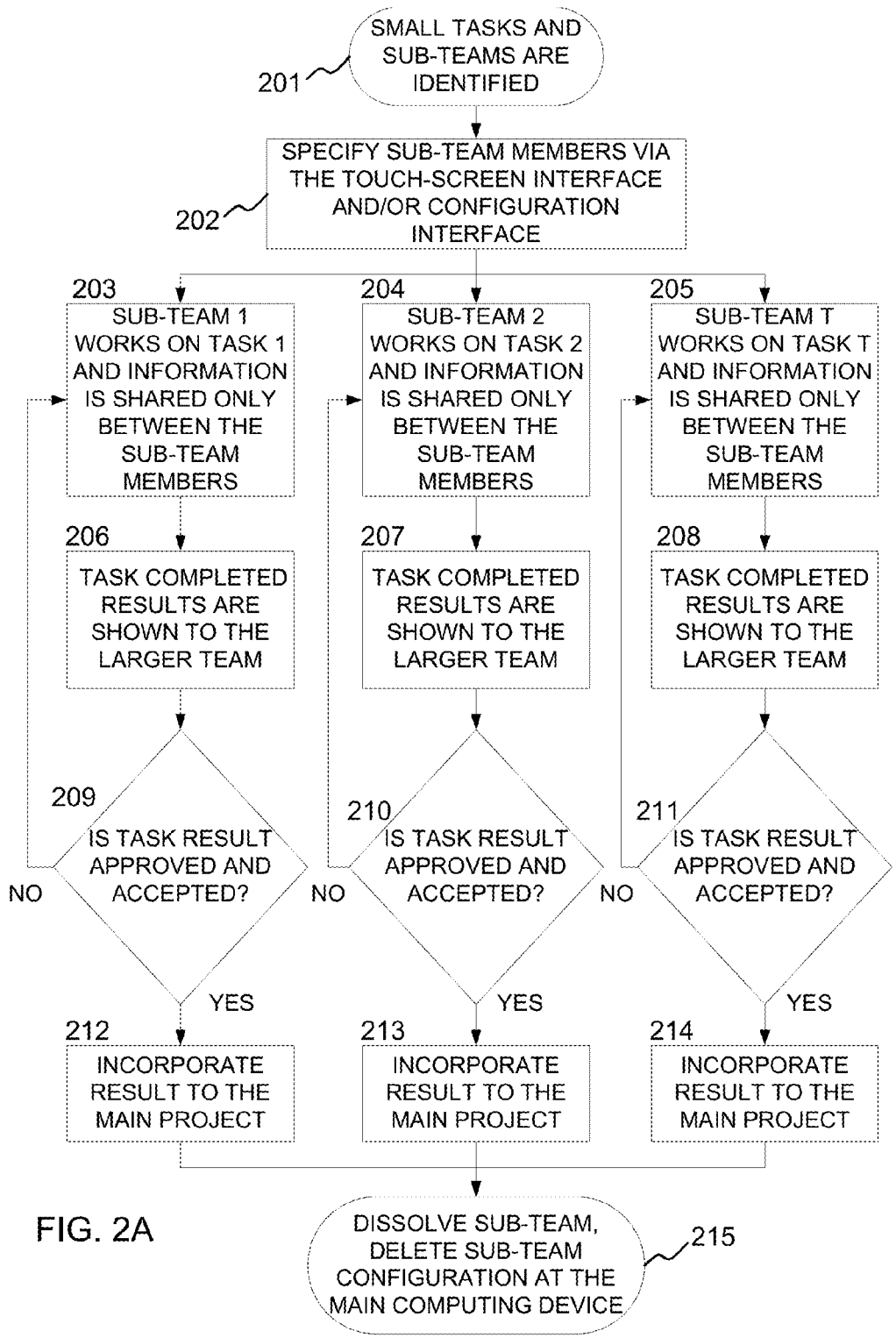
FIG. 2A is a flow diagram illustrating the operation when a main project task is divided into T smaller parallel tasks that are being completed by sub-teams known to a main computing device, according to an example embodiment of the present invention.

An example of a flow chart illustrating an example method of operation of a similar configuration to those of FIGS. 1A and 1C is illustrated in FIG. 2A. In this example, sub-teams of a larger team are assigned tasks to create a proposal for one or more smaller parts of the larger project. As a sub-team is working jointly on each smaller task, each member of a sub-team can see data as it is being manipulated and created by his or her sub-team members. Alternatively, the users may be limited to viewing only their own portion of the project while this information is not visible to the rest of the team.

Once the entire sub-team, or, a majority of the members, agrees on a proposal, it can be shared with the whole team. In the example illustrated in FIG. 1C, sub-teams of different geographical locations may work together on the same project. In this example, team members can have separate physical touch screen devices and separate locations.

Referring to FIG. 2A, the project delegation and setup procedure begins at operation 201 with small tasks and sub-teams being identified. The identification of the team members is performed based on a pre-registration setup procedure that the users participated in prior to the identification procedure. Alternatively, the identification of the team members is performed based on requests received from the users when they are attempting to login to a particular project. Next, sub-team members are specified via a touch screen and/or a configuration interface of a moderator who has ultimate decision making capabilities at operation 202. Sub-teams 1, 2 and 3 (assuming three teams are specified) and the respective users may then work on tasks 1, 2 and 3, respectively at operations 203-205. The task completed results are then provided to the larger team or sub-groups so all members of the team can view the results of a particular task at operations 206-208.

Once the users have viewed the results, a decision may be made at operations 209-211 as to whether the results of the task (tasks 1-3) work product should be kept and incorporated into the main project. If the groups decide not to keep the results and reject the work done, the sub-teams 1-3 may return to the "drawing board" and try another design and/or proposal. Assuming that the tasks are approved, then the results may be incorporated into the main project and saved in a memory location of the main computing device 190/1190, at operations 212-214. Lastly, the sub-team may be dissolved and/or deleted at the main computing device since the project has been completed, at operation 215.

To better illustrate the above-noted example consider, for example, a landscape or building architecture design project. The team leader may desire to proceed with the project by splitting the project into smaller parts and having the work performed in parallel. A small team of 2-3 users can be assigned a task of designing a driveway, while another small team is working on a guest house design in the rear of the house, etc. It is clear that sub-teams do not need to be co-located as long as they can share results of their work. Furthermore, even individual members of the sub-team may not need to be co-located, as the project data may be shared in real-time over the Internet. The present configuration allows such sharing between the teams at different locations provided that their touch screens are communicatively coupled to the same main computing device 190 of FIG. 1B.

When multiple inputs are being provided concurrently from one or more touch-sensitive areas, some form of coordinated input is required. During conventional collaborative projects (e.g., a team of several people writing a single word document), inputs from users are provided in sequential order and are being stored in multiple versions of the master document. Such a document may be reviewed and edited by other users at a later time. This approach however is not well suited for the touch-sensitive approach of manipulating data, especially if users are expected to collaborate in real-time by manipulating data and exchanging information through their respective touch-sensitive interfaces.

A problem that arises with these types of group design projects is referred to as "quick change syndrome", which may be an issue during collaboration of multiple users on projects where changes can be made quickly, especially in a touch screen environment. Because of the easy access to information and the interface, any participant of the collaborative project can make changes very quickly by changing a house color, a driveway shape, a size of a tree, etc. Sometimes this freedom to make substantial alterations to an ongoing project may disturb not only the rest of team but also confuse the application features, which may interpret initial suggestions from a user that he or she wants to share with the team, as a command for changing the design.

To reduce the likelihood that abrupt changes made by the team members does not disturb the project planning process, the example embodiments of the present invention may include an application that is operated in the main computing device (190 of FIG. 1B). The application may include software that pre-displays the recognized command instructions as they are being interpreted by the controller without actually committing them to the application and the corresponding context of the design. For example, assume three users are working jointly on designing a landscape for a new high-tech campus. Each user is responsible for his/her aspect of the design and can provide suggestions during the brainstorming session. By manually moving desired objects in and out of the designated touch-sensitive area, each user is capable of making a suggestion which is being not only articulated but also visually represented on a screen and can be simultaneously observed by all team members.

If the proposal is accepted by the team (or team leader), it can be given an "approved" status and proposed changes will be committed to the application and the visual context and stored in a corresponding memory file of the application. A "preview" sub-state, within the working state of operation of the main computing device 190 may be used to run the above-mentioned software application.

Figure 2B:
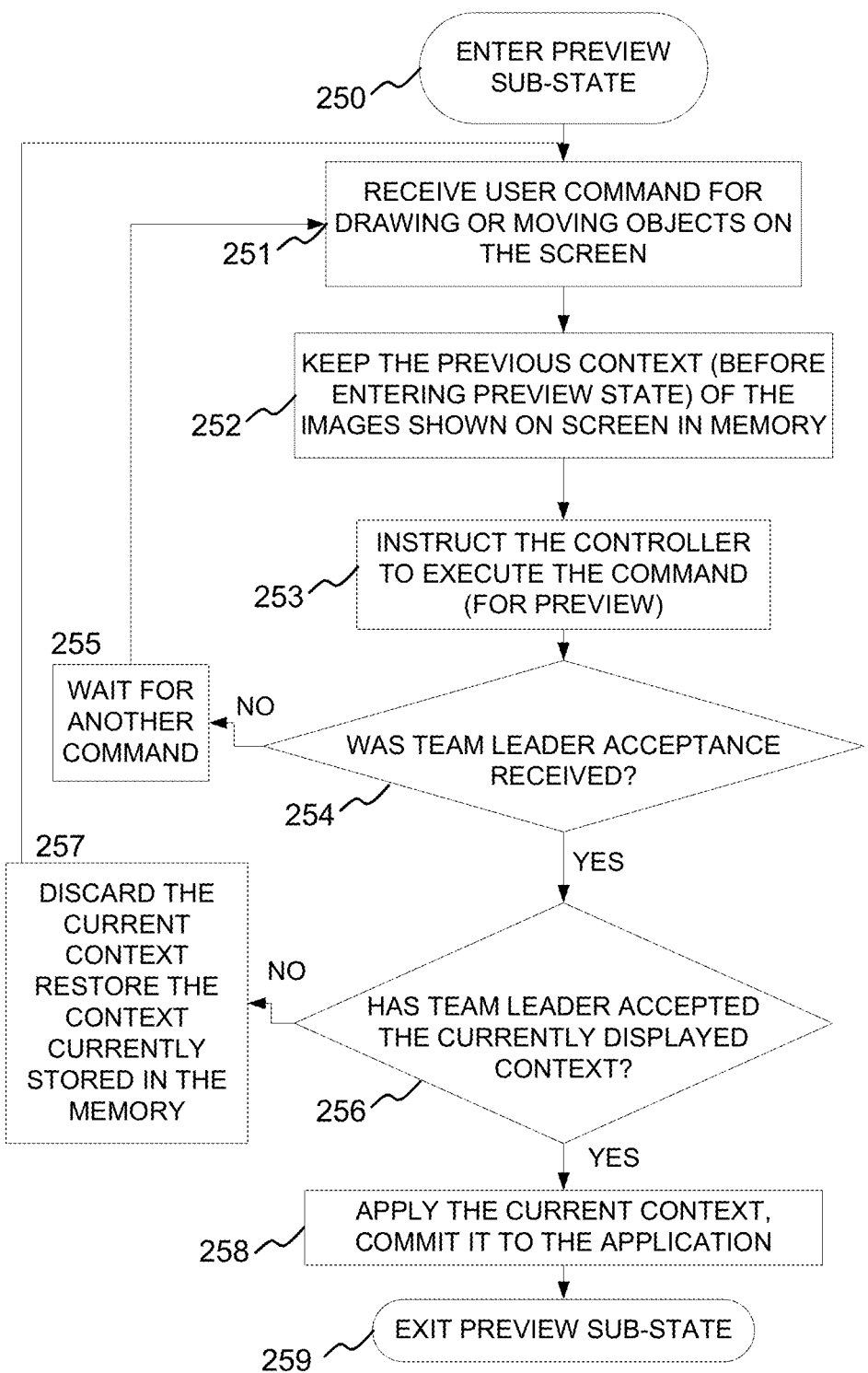
FIG. 2B is a flow chart of the operation of the main computing device, according to an example embodiment of the present invention.

FIG. 2B illustrates a flow chart diagram method to preview and later accept execution of a specific command. The command is a suggestion formed by a computing device and offered as a shortcut to the user. The computer generated suggestion is based on previous actions taken by the user in similar circumstances. For instance, the software application may prompt a user of the last pattern options matching the initial pattern of manual commands executed by the user in a preview sub-state. The command preview may be running as an application on the main computing device during a working state.

Referring to FIG. 2B, a preview sub-state is entered by the main computing device, at operation 250. The user command(s) are then received to draw or move objects on the screen of the user's interface and/or the main virtual screen used to preview the user's work progress, at operation 251. Before entering the preview state, the previous context of the images may be saved in memory so that the user's proposed changes do not alter the previous work accepted, and the controller may be instructed to execute the command to show the preview of new work performed by the user, at operations 252 and 253.

The team leader may accept or reject the preview of the user's work. The team leader may comment by sending a message to the user to modify a particular portion of the preview, make moderate changes and/or abandon the entire effort and start over, at decision operation 254. If the team leader does not accept the work, the user will wait and receive a command from the team leader suggesting a course of action at operation 255. If however the team leader accepts the work, another decision will be made regarding whether the current display should be saved at decision operation 256. If the leader decides not to accept the changes, the current context will be discarded and the previous context stored in memory will be accessed from memory at operation 257. However, if the team leader approves the changes, the data file in memory which stores the present context of the project may be updated and saved to reflect the new context offered by the user at operation 258, and the preview sub-state will be exited at operation 259.

Sometimes specific operations performed to manipulate data can become repetitive. For example, designing a neighborhood of homes, playing a board game, placing trees along a landscape, etc. As a result, the user of a touch screen application program may have to spend time repeating certain commands multiple times in order to complete his or her project proposal.

Figure 3:
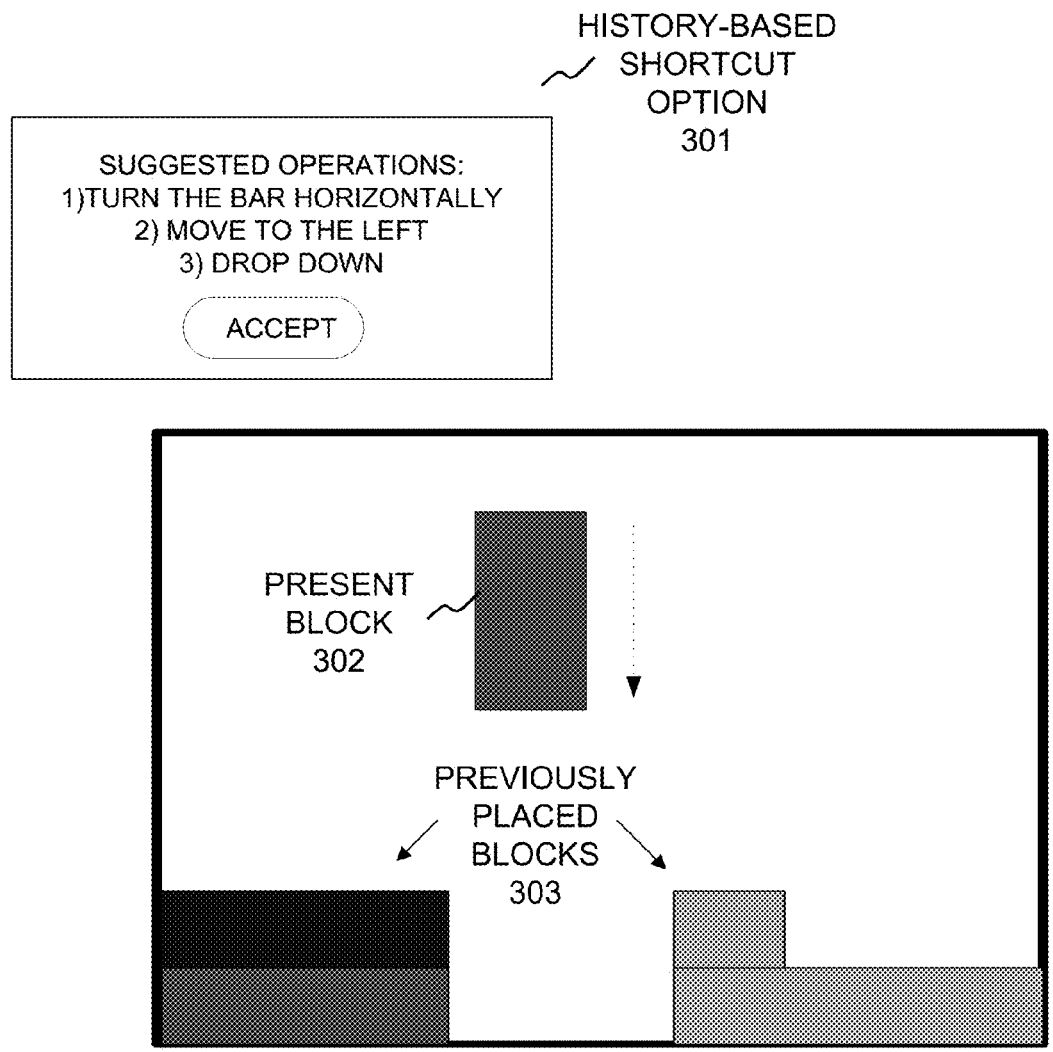
FIG. 3 is an example game of Tetris®, that illustrates one example of providing a user with a history of commands to prompt the user with an option to select a pattern of commands, according to an example embodiment of the present invention.

In one example, the user may be playing a board game, such as, TETRIS®, as illustrated in FIG. 3. Referring to FIG. 3, objects of various shapes (rectangle/bar, angle, square, etc.) are being presented to the user and dropped in a box at a certain rate. Objects appear one at a time and are sinking to the bottom of the box. The objective of the player is to pack these objects as tight as possible by rotating and moving them horizontally while they are free falling and before they touch any other block, which prevents further movement. A solid line will disappear rewarding the user for a successful line of blocks and adding to the user's score.

Suppose for the first number of times a rectangle/bar block appears (denoted "Nrec") the user rotated each rectangle into a horizontal position, moved it all the way to the left, and then dropped it down. The application will remember that particular pattern based on the occurrence of the "Nrec" parameter along with the user selected options which occurred, and offer a history-based shortcut option 301 so the user will not have to perform such an operation manually since it has been already been done before. As a result, the next time a rectangular block appears as a present block 302, the configuration will prompt the user to perform the same operations by executing a single command 301. The suggestion is based on the previously placed rectangular blocks 303 on the left side of the box.

Once the application has prompted the user to execute this pattern by touching/pushing the "ACCEPT" button illustrated in FIG. 3, the user may choose to press the button or continue manually playing the game. If the user presses the button, the whole sequence will be committed and a next playing block will appear. It should be understood that this game of TETRIS is only one example game, according to an example embodiment of the present invention.

Another example embodiment of the present invention may be a team of users working jointly on a landscape design project. As each user begins to illustrate his/her idea via the touch-sensitive interface, the application will track the operations performed by each user, and will have access to all of the users' files on their various computing devices including but not limited to their personal laptops, PDAs, cellular phones, etc.

Figure 4:
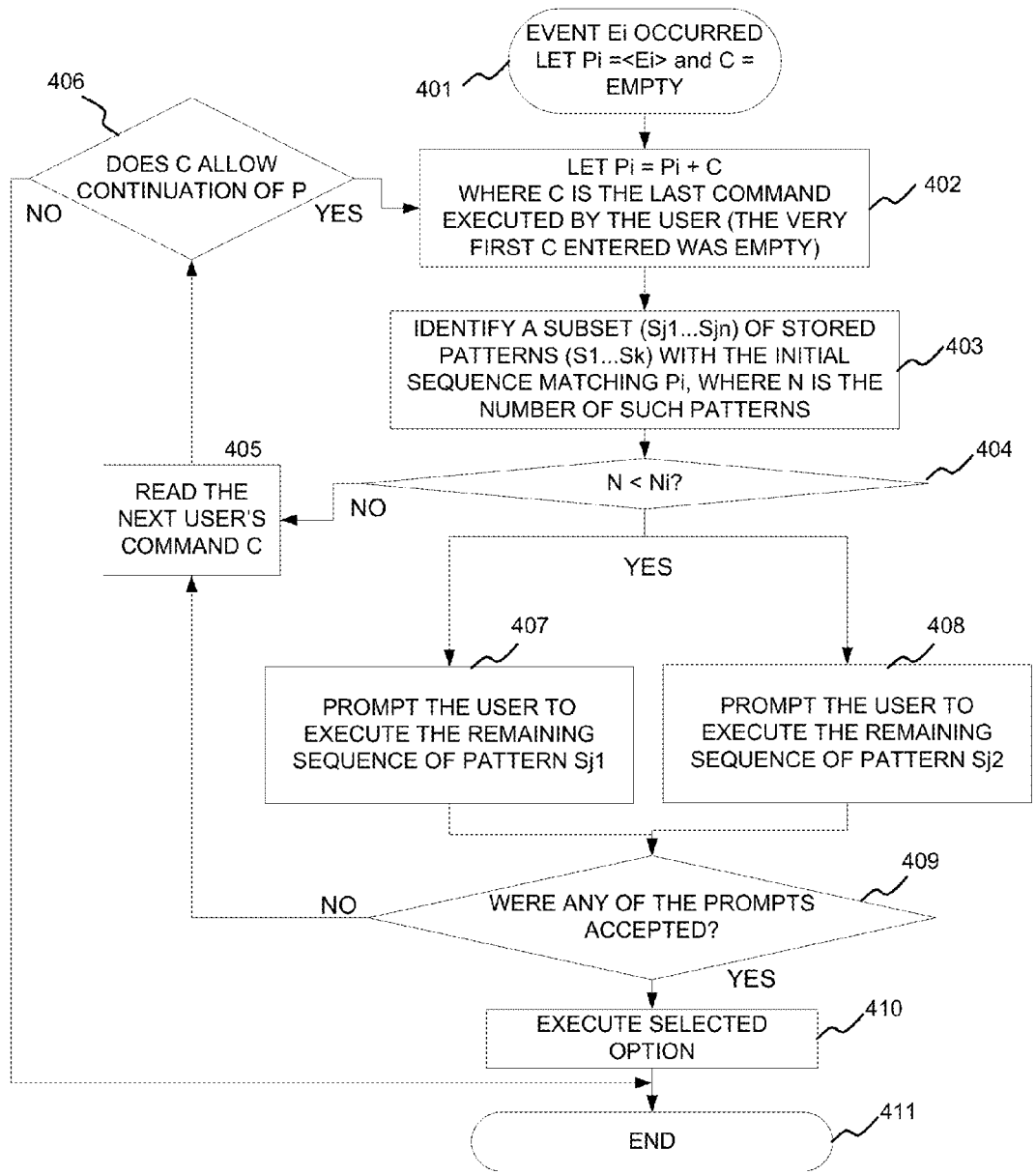
FIG. 4 is a flow chart illustrating an example method to prompt a user to select one of the previous command patterns from a history of commands, according to an example embodiment of the present invention.

FIG. 4 illustrates an example flow diagram of the computer program code that may be generated during a pattern recognition and execution procedure, according to an example embodiment of the present invention. Referring to FIG. 4, $S_1$ represents a particular sequence of commands, each different set sequence of commands may be represented by a different S (i.e., $S_1$, $S_2$, . . . $S_k$). A particular event E represents an occurrence of some change in the application, such as, a rectangular block appearing in a game of TETRIS. P is a variable used to represent a particular event that just occurred and C is a variable used to represent the user's last command.

In operation, an event $E_i$ may occur by a rectangular block appearing, and the event is identified by a particular variable $P_i$, which is then used to setup the equation $P_i=P_i+C$ so that the user's commands can be tracked based on the user's last command(s), at operations 401 and 402. Next, after the event occurs, subsets ($S_{j1}$, . . . $S_{jN}$) are identified from memory that match at least the first event and/or the initial user command(s) that matches $P_i$. Next, a variable N is introduced to represent the number of patterns found, and if N is not less than $N_i$ then more commands are viewed until a larger number of matching commands from sequences is discovered, at operations 405 and 406. However, if the user drops the block in the TETRIS game, then the operation will end at operation 406, otherwise the sequence continues.

Continuing with FIG. 4, if the number N is greater than the user is prompted to execute the remaining sequence of the identified pattern $S_{j1}$, at operation 407. Also, if the N is greater than two then other sequences may be found which match, and the user may be offered additional shortcut options and prompts, such as, $S_{j2}$, at operation 408. Once all of the prompts are offered at operation 409, the user may accept the options or ignore them. If the user accepts any of the options at operation 410, then the option selected will be executed ending the operation at "end" operation 411. Otherwise the sequence will continue to cycle and offer additional options based on the user's continued command selections.

The software executed in FIG. 4 may reside on the main computing device 190/1190, which stores the sequence of commands entered by the user. In summary, when the user begins entering a new sequence of commands, the configuration continually determines the number of stored sequences matching the newly performed sequence. If the number of matching sequences is less than predefined number, the configuration will prompt the user to execute the remaining commands for each of the selected sequences.

It should be understood that the generated user specific file(s) locations are not limited to a device physically present at the user's location, and may include remote file storing locations. For example, the user can specify a remote file configuration physically located on a device communicatively coupled with the touch sensitive screen and/or the main computing device via the Internet.

Based on what the user is inputting into the touch screen device, the application searches the files that are stored in the main computing device and begins to search and provide the matching information in the stored files (e.g., text, mpeg, jpeg, CAD drawing, etc.), which are related to the user's input. This information can be provided on a separate portion of the screen, or, it can automatically be incorporated into the area (120 of FIG. 1B) where the joint work is presented. The command prompt suggestion sequence will automatically go through multiple iterations until the user or users agree that the current information being presented is appropriate enough to be selected.

In another example of creating a house and surrounding area, the entire team may be able to see the proposal as the application is altering the present design. For example, one user may be inputting information about a circular driveway on any of the design input areas 130, 140, 150, 160 and 170 in FIG. 1B by informing the application that a circular driveway is needed. The application may be "informed" by a variety of methods, including, but not limited to: manual drawing of the circular driveway with a finger, a user's voice command (e.g., "show a circular drive way") that is recognized by the application, etc.

The application will then scan the user's files and begin to add all of the images of different circular driveways that were stored previously. Assuming there are 10 such images, the application will automatically present each of these images either alone or in relation to the size and scope of the other images that may already be on the screen. For example, circular driveways may be provided that are in relation to landscaping that has already been provided around an existing house.

The user will place (via manual drag and drop command or following more detailed voice instruction) each offered image of a circular driveway into a desired location of the picture seen by the whole team. In this example, the circular driveway could appear in a presumed location related to the entrance of the house and any landscaping that would block the circular drive would automatically be removed or can be placed on an outer portion of the screen. These landscaping objects, such as trees or shrubs, etc., can then be placed in different locations by the user moving them to such a location.

The application is configured to recognize repetitive commands executed by the user for a first number of options of circular driveways (denoted "N_pat") provided for the team. In this case, the application will prompt the user to repeat the same landscape manipulation pattern when the next circular driveway is selected for demonstration. The user can simply instruct the application (e.g., by voice command) to repeat the procedure for all available images of circular driveways. The process will be repeated until the application is instructed to accept one of the images or reject all of them and roll back to previous configuration.

Figure 5:
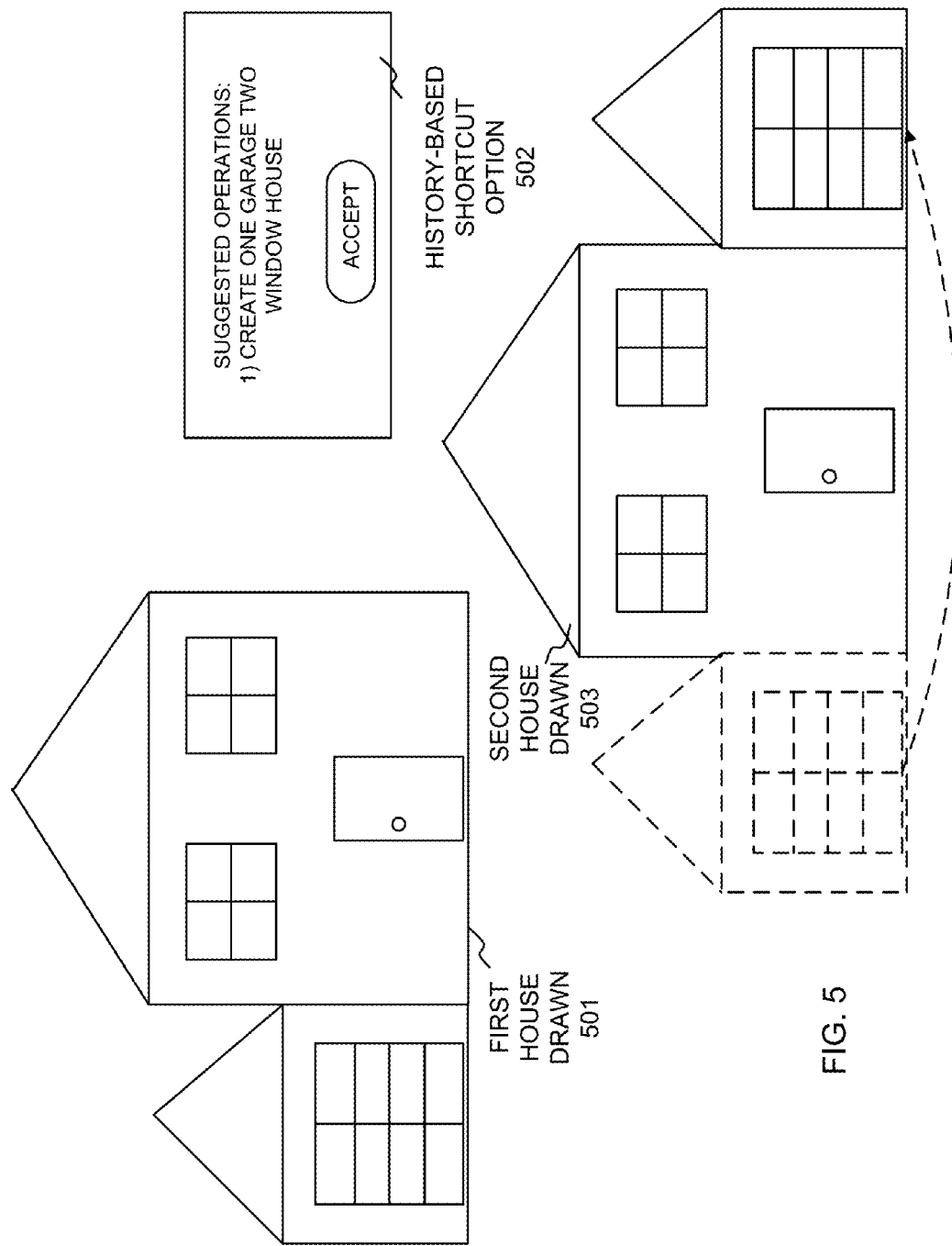
FIG. 5 is an example design effort of designing homes that illustrates another example of providing a user with a history of commands to prompt the user with an option to select a pattern of commands, according to an example embodiment of the present invention.

In one example, according to an example embodiment of the present invention, an entire set of commands may be offered to the user based on the history of selections made by that user and/or other members of the team or sub-team, according to an example embodiment of the present invention. Referring to FIG. 5, a first house is drawn 501 for a neighborhood of homes that are to be created by the entire team. In this particular instance, a one car garage home with two windows 501 was created. The application may perform a similar method to that illustrated in FIG. 4 to suggest to the user to create another house 503 by offering a history-based shortcut option 502. However, in this particular example, the houses are adjacent on the same street, so it was necessary to move the garage to the other side of the second house 503. Such a simple alteration is much less work for the user than creating an entire second house 503 from scratch.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 130, 140, 150, 160, 170, 185 and 190 and similar components in other drawings.

Figure 6:
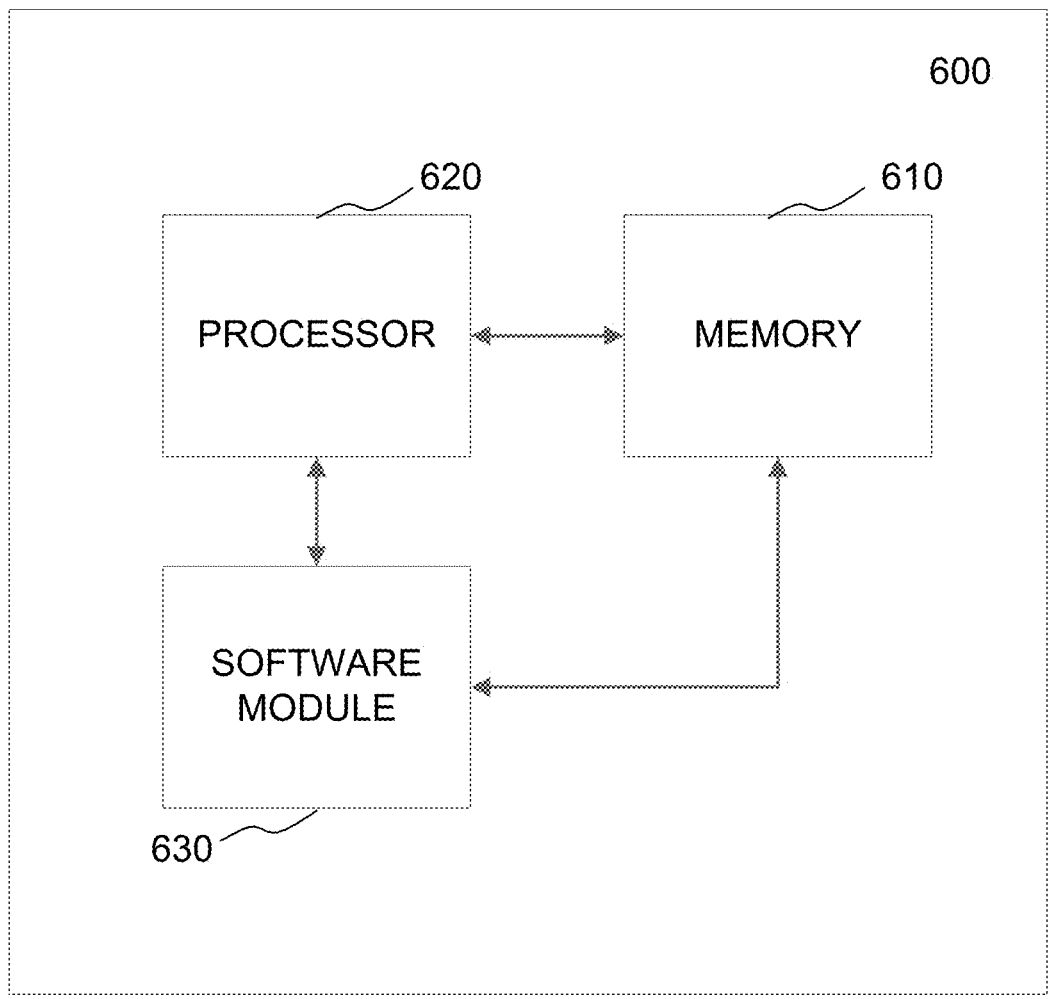
FIG. 6 is a network entity device that may embody computer program code that when executed performs one or more methods of the example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of creating a user menu option that a user selects to operate a particular application, the method comprising:
    determining an event has occurred in the application and storing the occurrence of the event in memory;
    determining the user's last command executed in the application in response to the event and storing the last command in the memory with at least one other previously executed user command according to the execution order of the last command and the at least one other previously executed user command as a sequence of the user's previous command selections, wherein the user's last command and the at least one other previously executed command are executed by selection operation of a particular object associated with the application;
    identifying a subset of sequences of commands stored in the memory that match the sequence of the user's previous command selections which include at least the user's last command executed and the at least one other previously executed user command, wherein the identifying is repeated each time an additional user command is executed;
    determining the number of matching sequences of commands is greater than a predefined number of matching sequences of commands;
    prompting the user with a plurality of menu options to execute all remaining commands for any of the plurality of identified stored sequences of commands each comprising the user's last command executed and the at least one other previously executed user command;
    displaying the plurality of menu options as a single command selection that invokes the sequence of the user's previous command selections based on the identified sequence of commands stored in the memory; and
    automatically invoking execution of the identified sequence of commands comprising the sequence of the user's previous command selections upon receiving confirmation of the single command selection being executed.

2. The method of claim 1, further comprising:
    determining whether any of the prompts were selected by the user, and if so, then executing the selected option, and if not,
    then reading the user's next command executed and repeating appending the next command executed to the sequence of the user's previous command selections in the memory;
    repeating identifying a subset of sequences of commands stored in the memory that that match the sequence of the user's previous command selections; and
    repeating displaying a plurality of menu options to the user based on the identified sequences of commands stored in the memory, and prompting the use to select the plurality of menu options.

3. The method of claim 1, wherein a next command is automatically started upon the user selecting the menu option.

4. The method of claim 1, wherein a next event begins a new shortcut menu option creation procedure that includes searching for matching sequences of commands based on the next event, a last command executed by the user in response to the next event and at least one additional command execution not previously included in the previous identifying operation.

5. The method of claim 1, wherein the user command execution is provided by a touch screen input device.

6. An apparatus configured to create a user menu option that a user selects to operate a particular application, the apparatus comprising:
    a processor configured to determine an event has occurred in the application; and
    a memory configured to store the occurrence of the event; the processor is further configured to
    determine the user's last command executed in the application in response to the event and store the last command in the memory with at least one other previously executed user command according to the execution order of the last command and the at least one other previously executed user command as a sequence of the user's previous command selections, wherein the user's last command and the at least one other previously executed command are executed by selection operation of a particular object associated with the application;
    identify a subset of sequences of commands stored in the memory that match the sequence of the user's previous command selections which include at least the user's last command executed and the at least one other previously executed user command, wherein the identifying is repeated each time an additional user command is executed;
    determine the number of matching sequences of commands is greater than a predefined number of matching sequences of commands,
    prompt the user with a plurality of menu options to execute all remaining commands for any of the plurality of identified stored sequences of commands each comprising the user's last command executed and the at least one other previously executed user command, display the plurality of menu options as a single command selection that invokes the sequence of the user's previous command selections based on the identified sequence of commands stored in the memory, and automatically invoke execution of the identified sequence of commands comprising the sequence of the user's previous command selections upon a receipt of a confirmation of the single command selection being executed.

7. The apparatus of claim 6, wherein the processor is further configured to determine whether any of the prompts were selected by the user, and if so, then executing the selected option, and if not, then the processor is further configured to read the user's next command executed and repeat appending the next command executed to the sequence of the user's previous command selections in the memory;

repeat identifying a subset of sequences of commands stored in the memory that match the sequence of the user's previous command selections; and repeat displaying a plurality of menu options to the user based on the identified sequences of commands stored in the memory, and prompting the use to select the plurality of menu options.

8. The apparatus of claim 6, wherein a next command is automatically started by the processor upon the user selecting the menu option.

9. The apparatus of claim 6, wherein a next event begins a new shortcut menu option creation procedure that includes searching for matching sequences of commands based on the next event, a last command executed by the user in response to the next event and at least one additional command execution not previously included in the previous identifying operation.

10. The apparatus of claim 6, wherein the user command execution is provided by a touch screen input device.

11. A non-transitory computer readable storage medium configured to store a computer program that when executed performs a procedure of creating a user menu option that a user may selects to operate a particular application, the executed program further performs:

determining an event has occurred in the application and storing the occurrence of the event in memory;

determining the user's last command executed in the application in response to the event and storing the last command in the memory with at least one other previously executed user command according to the execution order of the last command and the at least one other previously executed user command as a sequence of the user's previous command selections, wherein the user's last command and the at least one other previously executed command are executed by selection operation of a particular object associated with the application;

identifying a subset of sequences of commands stored in the memory that match the sequence of the user's previous command selections which include at least the user's last command executed and the at least one other previously executed user command, wherein the identifying is repeated each time an additional user command is executed;

determining the number of matching sequences of commands is greater than a predefined number of matching sequences of commands;

prompting the user with a plurality of menu options to execute all remaining commands for any of the plurality of identified stored sequences of commands each comprising the user's last command executed and the at least one other previously executed user command;

displaying the plurality of menu options as a single command selection that invokes the sequence of the user's previous command selections based on the identified sequence of commands stored in the memory; and automatically invoking execution of the identified sequence of commands comprising the sequence of the user's previous command selections upon receiving confirmation of the single command selection being executed.

12. The non-transitory computer readable storage medium of claim 11, further comprising:

determining whether any of the prompts were selected by the user, and if so, then executing the selected option, and if not, then reading the user's next command executed and repeating appending the next command executed to the sequence of the user's previous command selections in the memory;

repeating identifying a subset of sequences of commands stored in the memory that match the sequence of the user's previous command selections; and repeating displaying a plurality of menu options to the user based on the identified sequences of commands stored in the memory, and prompting the use to select the plurality of menu options.

13. The non-transitory computer readable storage medium of claim 11, wherein a next command is automatically started upon the user selecting the menu option.

14. The non-transitory computer readable storage medium of claim 11, wherein a next event begins a new shortcut menu option creation procedure that includes searching for matching sequences of commands based on the next event, a last command executed by the user in response to the next event and at least one additional command execution not previously included in the previous identifying operation.

* * * * *